Jan. 26, 1943. P. B. REEVES 2,309,330
NAILED WOOD BLOCK BELT SPLICE
Filed March 30, 1942

INVENTOR.
PAUL B. REEVES,
BY: Hood & Hahn.
ATTORNEYS.

Patented Jan. 26, 1943

2,309,330

UNITED STATES PATENT OFFICE 2,309,330

NAILED WOOD BLOCK BELT SPLICE

Paul B. Reeves, Columbus, Ind., assignor to Reeves Pulley Company, Columbus, Ind., a corporation of Indiana Application March 30, 1942, Serial No. 436,814

10 Claims. (Cl. 24—37)

The present invention relates to a belt splice, and more particularly to a splice including wooden blocks, to which the opposite end portions of the belt to be spliced are preliminarily nailed, and which blocks are then suitably secured together to produce the splice. The invention is primarily concerned with the production of a splice of the character above described in a belt of the edge active type, used in connection with variable speed transmissions of the variable V-pulley type; but the invention is not by any means strictly limited to that application.

The primary objects of the invention are to produce an inexpensive but highly effective splice, the elements of which can be very readily connected together to secure the ends of the belt to each other. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Figure 1:
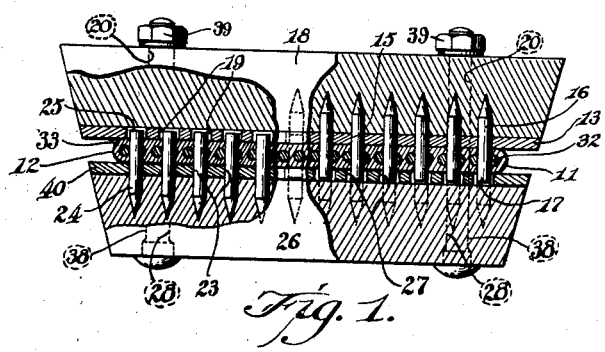
Fig. 1 is a section taken transversely of the belt in the region of the splice, separate portions of the view being taken upon separate planes, so that the left-hand portion of the figure illustrates a section through one end of the belt, while the right-hand portion of the figure illustrates a section through the other end of the belt.
Figure 2:
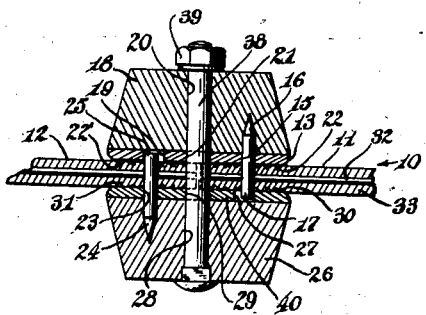
Fig. 2 is a longitudinal section through the splice.

Referring more particularly to the drawing, the reference numeral 10 generally indicates a belt of any desired construction, the ends 11 and 12 of which are to be connected together by the splice of the present invention. A plate 13, preferably formed of metal, is to be attached to one end 11 of the belt; and its greatest dimension is somewhat greater than the transverse dimension of the belt 10. The plate may be considered as having a median line 14, extending in the greatest dimension of the plate; and said plate is formed with a series of holes 15, arranged on one side of said median line and substantially parallel thereto. The plate 13 is placed in contact with the outer surface of the belt end 11, in such a position that only that portion of the plate on said one side of the median line is lapped by the belt end; and thereafter, nails 16 are driven, from the inner surface of the belt end through said belt, through the holes 15, and into a block 18, preferably formed of wood, and seated upon that surface of the plate 13 remote from the belt end 11. The nails are so dimensioned as to pass rather snugly through the holes 15; and by means of the nails, the plate 13 and block 18 are secured to the belt end 11. It may be noted that the plate 13 is preferably formed on its inner surface with barbs 22 facing toward the left and arranged on the right-hand side of the median line 14, as viewed in Fig. 2, and with further barbs 22' facing toward the right and arranged on the left-hand side of said median line. It will be seen that, as the plate 13 and block 18 are secured to the belt end 11, these barbs 22 will dig into the outer surface of the belt end.

Some, if not all, of the nails 16 are driven only so far into the block 18 as to leave portions 17 of their blunt ends upstanding from the inner surface of the belt end 11, for a reason later to be pointed out.

A second series of holes 19 is formed on the opposite side of the median line 14 of the plate 13, said holes 19 being arranged symmetrically with respect to the holes 15. The block 18 is formed with two bores 20 adjacent its opposite ends, and the plate 13 is formed with apertures 21 registering with the bores 20, for a purpose later to be described.

A second plate 40, similar in all respects to plate 13, is formed with a series of holes 23 like the holes 15, arranged on one side of the median line of said plate 40, and substantially parallel thereto; and said plate 40 is associated with the inner surface of the end 12 of the belt, said belt end lapping only that portion of said plate on said one side of its median line. Nails 24 are driven from the outer surface of the belt end 12 through said belt end, snugly through the holes 23, and into the block 26 which is seated on the inner surface of the plate 40. Some, if not all, of the nails 24 are driven only so far into the block 26 as to leave portions 25 of their blunt ends upstanding from the outer surface of the belt end 12. On the opposite side of its median line, the plate 40 is formed with a series of larger holes 27, arranged symmetrically with the holes 23. The plate 40 is formed with barbs 30 and 31, arranged on opposite sides of the median line of the plate on its outer side, and facing in opposite directions.

Figure 3:
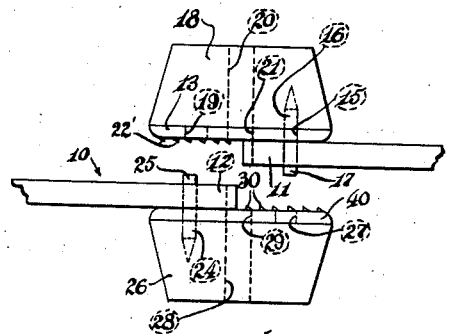
Fig. 3 is a side elevation of the elements of the splice before the two ends and their associated members have been connected together.
Figure 4:
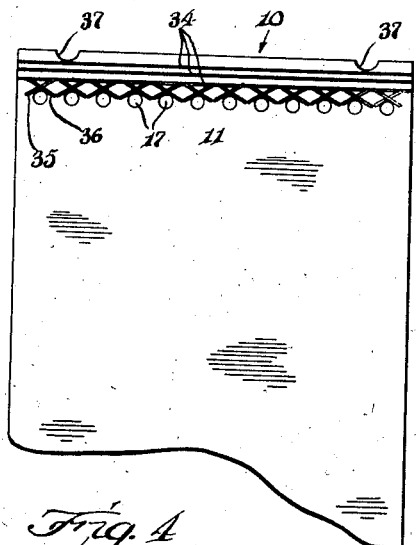
Fig. 4 is a plan of one end of the belt.
Figure 5:
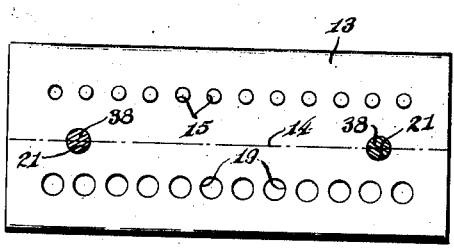
Fig. 5 is a plan of one of the plates which is an element of the splice.

It will be seen that, when the belt ends are brought into the relative positions illustrated in Fig. 3, the two ends may be assembled by moving the blocks 18 and 26 rectilinearly toward each other. Bolts 38 may then be passed through the holes 28 in the block 26 and holes 29 in the plate 40, and through the holes 21 of the plate 13 and bores 20 of the block 18; and the two assemblies may be clamped together by nuts 39 turned down on the bolts 38. In this assembling operation, the projecting portions 17 of the nails 16 will be received in the holes 27 of the plate 40, while the projecting portions 25 of the nails 24 will be received in the holes 19 of the plate 13. The assembly is facilitated by the fact that the holes 19 and 27 are materially larger than the projecting portions 25 and 17 of the nails 24 and 16, so that the projecting nail portions can be readily snapped into said holes. The parts are so proportioned, however, that those portions of the holes and the nail projections which cooperate to transmit stress from one belt end to the other, are in contact. Thus, assuming that the belt is to run from left to right as viewed in Fig. 2, it will be noted that the pull exerted by the belt end 11 upon the nails 16 is transmitted from the right-hand surface of each nail 16 to the right-hand periphery of each hole 27; while that pull is transmitted from the plate 13 to the nails 24 through direct engagement of the left-hand periphery of each of the holes 19 with the engaged portion of the projection 25 of each of the nails 24.

Frequently, the belt body of a belt to be used with a V-pulley type of variable speed transmission comprises a series of cords, arranged in substantial parallelism and extending in the direction of length of the belt, said cords being embedded in an envelope of suitable characteristics. A belt of this character is illustrated herein, the cords being indicated by the reference numeral 32 and the envelope by the reference numeral 33. In such a belt, at least some of the nails used in building up the above-described splice will pass between adjacent cords 32, and will therefore be held in place with respect to the belt body only by the material of the envelope. Since that material has a relatively low tensile strength, there would be a tendency, in the splice herein disclosed, for the nails to pull longitudinally out of the belt, tearing the material of the envelope. To guard against such an occurrence, I prefer to form one or more transverse rows of stitching 34, for instance of linen thread, across each belt end between the positions of the nails 16 and 24 and the adjacent belt extremity. In addition thereto, I prefer to provide further reinforcing means which, in its preferred embodiment, may comprise two series 35 and 36 of metal staples, arranged in crossing pairs. Thus each staple 35 cooperates with each staple 36 in X-formation to produce a V notch, the arms of which embrace a nail, immediately between that nail and the adjacent extremity of the belt. Expressed otherwise, each nail is embraced within the crotch of a metallic V which forms an abutment immediately interposed between that nail and the adjacent belt extremity. While other means may be provided for effecting the same kind of V-shaped reinforcing abutment, I now consider the embedment of metallic staples, either of wire or of flat metal strip construction, in the belt body, in crossed relation, to be the best embodiment of reinforcement to exemplify this phase of my invention.

Preferably, each extremity of the belt will be formed with a pair of notches 37, 37 to pass the bolts 38.

I claim as my invention:

1. In a splice for a belt, a first transversely rigid block associated with an end of said belt, a second transversely rigid block associated with the other end of said belt, a plurality of elements passing through each belt end and embedded in the associated block to secure such block to such belt end, certain of such elements upstanding beyond that surface of the belt opposite the associated block, each of said blocks being provided with a plurality of sockets adapted to receive such upstanding portions of the elements embedded in the other of said blocks, the dimensions of said sockets being materially greater than the corresponding dimensions of said upstanding portions, and means securing said blocks against separation in a direction perpendicular to the plane of travel of said belt.

2. In a splice for a belt, a first transversely rigid block and a second transversely rigid block, substantially one-half the dimension of said first block in the direction of belt length overlapping one surface of one end of said belt, a plurality of nails driven through said belt end and into said block to secure said block to said belt end, the blunt ends of certain of said nails upstanding an appreciable distance from the opposite surface of said belt end, substantially one-half the dimension of said second block in the direction of belt length overlapping the opposite surface of the other end of said belt, a plurality of nails driven through said other belt end and into said second block to secure said second block to said other belt end, the blunt ends of certain of said last-named nails upstanding an appreciable distance from the surface of said other belt end opposite said second block, a plurality of sockets associated with each of said blocks on the unlapped portions thereof and adapted to receive the upstanding portions of the nails driven into the other of said blocks, said sockets being appreciably larger than said upstanding nail portions, and means clamping said blocks together.

3. In a splice for a belt made up of a plurality of substantially parallel, longitudinally extending passes of cord or the like embedded in a cover, a transversely rigid block associated with an end of said belt, a plurality of nails driven through said belt end and into said block, and metal means secured in said belt end between each of said nails and the adjacent extremity of said belt and tending to prevent said nails from tearing longitudinally through such cover between said cords.

4. In a splice for a belt made up of a plurality of substantially parallel, longitudinally extending passes of cord or the like embedded in a cover, a transversely rigid block associated with an end of said belt, a plurality of nails driven through said belt end and into said block, and metal means secured in said belt end and forming a V between each of said nails and the adjacent extremity of said belt, each nail being embraced in the crotch of such a V whereby such metal means tends to prevent said nails from tearing longitudinally through such cover between said cords.

5. In a splice for a belt made up of a plurality of substantially parallel, longitudinally extending passes of cord or the like embedded in a cover, a transversely rigid block associated with an end of said belt, a plurality of nails driven through said belt end and into said block, and abutment means secured in said belt end between said nails and the adjacent extremity of said belt, such abutment means providing a V crotch embracing each of said nails and tending to prevent said nails from tearing longitudinally through such cover between said cords.

6. In a splice for a belt made up of a plurality of substantially parallel, longitudinally extending passes of cord or the like embedded in a cover, a transversely rigid block associated with an end of said belt, a plurality of nails driven through said belt end and into said block, and an arrangement of cross stitches forming an abutment between said nails and the adjacent extremity of said belt, each of said nails being embraced between the arms of an X formation of stitches tending to prevent said nails from tearing longitudinally through such cover between said cords.

7. In a splice for a belt made up of a plurality of substantially parallel, longitudinally extending passes of cord or the like embedded in a cover, a transversely rigid block associated with an end of said belt, a plurality of nails driven through said belt end and into said block, and a plurality of pairs of metal staples embedded in said belt between said nails and the adjacent extremity of said belt, each pair of staples being arranged to form an X, and each nail being embraced in the crotch between said staples which faces away from said belt extremity, whereby said staples tend to prevent said nails from tearing longitudinally through such cover between said cords.

8. In a splice for a belt made up of a plurality of substantially parallel, longitudinally extending passes of cord or the like embedded in a cover, a transversely rigid block associated with an end of said belt, a plurality of nails driven through said belt end and into said block, at least one transverse row of stitches sewn into said belt between said nails and the adjacent extremity of said belt, and additional metal means secured in said belt between said nails and said extremity and tending to prevent said nails from tearing longitudinally through such cover between said cords.

9. In a belt splice, a first plate partially lapped by one end of said belt and formed with a plurality of holes in its lapped portion arranged in a series extending transversely of said belt, a block seated on the surface of said plate remote from said belt, a series of nails driven through said belt, snugly passing through said plate holes, and into said block to secure said plate and block to said belt end, the blunt ends of certain of said nails being left upstanding from the entered surface of said belt end, a second plate partially lapped by the opposite surface of the other end of said belt and formed with a plurality of holes in its lapped portion arranged in a series extending transversely of said belt, a second block seated on the surface of said second plate remote from said belt, a series of nails driven through the said other end of said belt, snugly passing through the holes in said second plate, and into said second block to secure said second plate and second block to said other belt end, the blunt ends of certain of said last-mentioned series of nails being left upstanding from the entered surface of said second belt end, a series of holes formed in the unlapped portion of each of said plates, said last-mentioned holes being materially larger than the upstanding portions of said nails and said last-mentioned holes in each of said plates being adapted to receive the upstanding portions of the nails driven through the other plate, and means engaging both of said blocks to hold said upstanding nail portions against removal from said last-mentioned holes.

10. In a belt splice, a first plate provided, on one side of a median line, with a series of holes arranged transversely of the length of said belt and substantially parallel with said line, said plate being located in contact with the outer surface of said belt with one extremity of said belt lapping only that portion of said plate on said one side of said median line, said plate being further formed with a second series of holes, larger in diameter than said first holes, and arranged on the opposite side of said median line substantially symmetrically with the arrangement of said first series of holes, a block seated on the surface of said plate remote from said belt, a series of nails driven through said belt from the inner surface thereof, snugly passing through the holes of said first series, and into said block to secure said plate and block to said belt end, the blunt ends of certain of said nails being left upstanding from said inner surface of said belt, a second plate provided, on one side of a median line, with a series of holes corresponding to the first series of holes on said first plate and arranged transversely of the length of said belt and substantially parallel with said line, said second plate being located in contact with the inner surface of said belt with the other extremity of said belt lapping only that portion of said second plate on said one side of said median line, said second plate being further formed with a second series of holes, corresponding to the second series of holes in said first plate, and arranged on the opposite side of said median line substantially symmetrically with the arrangement of the first series of holes in said second plate, a second block seated on the surface of said second plate remote from said belt, a series of nails driven through said belt from the outer surface thereof, snugly passing through the holes of the first series in said second plate and into said second block to secure said second plate and block to said other belt end, the blunt ends of certain of said last-named series of nails being left upstanding from said outer surface of said belt, said upstanding portions of said nails passing through the first series of holes in said first plate being received in the second series of holes in said second plate and the upstanding portions of said nails passing through the first series of holes in said second plate being received in the second series of holes in said first plate when the portion of said second plate on the other side of its median line laps said one end of said belt and the portion of said first plate on the other side of its median line laps said other end of said belt, and means engaging both of said blocks to hold the same against separation.

PAUL B. REEVES.